United States Patent
Mallmann et al.

(10) Patent No.: US 7,086,229 B2
(45) Date of Patent: Aug. 8, 2006

(54) PISTON FOR A HYDRAULIC BRAKE SYSTEM AND MASTER CYLINDER EQUIPPED THEREWITH

(75) Inventors: Markus Mallmann, Pfalzfeld (DE); Dirk Runkel, Mendig (DE); Kam Chau, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/154,739

(22) Filed: Jun. 16, 2005

(65) Prior Publication Data
US 2005/0229774 A1    Oct. 20, 2005

Related U.S. Application Data

(63) Continuation of application No. PCT/EP03/13962, filed on Dec. 9, 2003.

(30) Foreign Application Priority Data
Dec. 16, 2002 (DE) ................................ 102 58 790

(51) Int. Cl.
*B60T 11/16* (2006.01)
(52) U.S. Cl. ......................................... 60/589; 60/585
(58) Field of Classification Search ............. 60/585, 60/586, 588, 589; 91/369.3
See application file for complete search history.

(56) References Cited

U.S. PATENT DOCUMENTS

| 2,136,835 | A | | 11/1938 | Begg |
| 5,473,896 | A | | 12/1995 | Bergelin et al. |
| 6,065,292 | A | * | 5/2000 | Unterberg ..................... 60/589 |
| 6,203,022 | B1 | * | 3/2001 | Struschka et al. ............ 60/589 |

FOREIGN PATENT DOCUMENTS

| DE | 39 32 248 | 4/1990 |
| DE | 44 25 403 | 1/1996 |
| EP | 0 607 370 | 2/2002 |
| FR | 2 209 433 | 6/1974 |

* cited by examiner

*Primary Examiner*—Thomas E. Lazo
(74) *Attorney, Agent, or Firm*—MacMillan, Sobanski & Todd, LLC

(57) ABSTRACT

The invention relates to a piston having a valve arrangement for a vehicle hydraulic brake system comprising a piston channel penetrating the piston, a valve seat formed around an opening of the piston channel, and a valve element, which is displaceable relative to the piston and which for sealing the piston channel is positionable in a fluid-tight manner against the valve seat, wherein the valve seat takes the form of an annular projection on a sealing component, which comprises an elastic sealing element and a support element, which stabilizes the sealing element, and wherein the support element is designed in a region close to the sealing projection with a corresponding annular recess.

13 Claims, 2 Drawing Sheets

PISTON FOR A HYDRAULIC BRAKE SYSTEM AND MASTER CYLINDER EQUIPPED THEREWITH

CROSS REFERENCE TO RELATED APPLICATIONS

This application is a continuation of International Application No. PCT/EP03/13962 filed Dec. 9, 2003, the disclosures of which are incorporated herein by reference, and which claimed priority to German Patent Application No. 102 58 790.6 filed Dec. 16, 2002, the disclosures of which are incorporated herein by reference.

BACKGROUND OF THE INVENTION

The present invention relates to a piston with a valve arrangement for a vehicle hydraulic brake system comprising a piston channel penetrating the piston, a valve seat formed around an opening of the piston channel, and a valve element, which is displaceable relative to the piston and for sealing the piston channel is positionable in a fluid-tight manner against the valve seat, wherein the sealing seat takes the form of an annular projection on a sealing component, which comprises an elastic sealing element and a support element, which stabilizes the sealing element.

Such a piston is known from EP 0 607 370 B2, and corresponding U.S. Pat. No. 5,473,896 which is incorporated by reference herein, and according to this background art is installed in a master brake cylinder of a vehicle brake system. The piston together with the master brake cylinder encloses a pressure chamber. In a ready position prior to a brake actuation, the valve arrangement is in an open position, in which the pressure chamber communicates with a hydraulic fluid reservoir. When a driver of the vehicle initiates a braking operation, the piston is displaced inside the master brake cylinder. In said case, the valve arrangement closes in that the valve element positions itself in a fluid-tight manner against the sealing seat, thereby interrupting the fluidic connection between the pressure chamber and the hydraulic fluid reservoir. Consequently, a high hydraulic pressure builds up in the pressure chamber and leads to actuation of the vehicle brake circuit and to activation of the vehicle brakes. On completion of the braking operation, the piston is moved back into its ready position, wherein the valve arrangement opens and the pressure in the pressure chamber reduces.

In modern vehicle brake systems, in addition to the previously described braking-induced pressure increase, considerable pressure increases moreover arise in the pressure chamber when automatic brake pressure generating systems, such as e.g. a vehicle traction control system or a vehicle stability control system, are activated. Such automatic brake pressure generating systems are used for selective actuation of a brake circuit independently of an active braking operation by the driver in order to activate individual wheel brakes for increased vehicle safety. The pressure increase in the pressure chamber is effected, for example, by means of an additional hydraulic pump. The pressure thus increased then has to be reduced by opening the valve arrangement.

It has been shown that the elastic sealing element according to the background art in the region, in which it is exposed to the pressurized hydraulic fluid in the pressure chamber, has a tendency to deform elastically and, especially given high hydraulic pressures, to "flow". If, given high hydraulic pressure in the pressure chamber, the piston is moved back into its ready position, then, as the valve arrangement starts to open, i.e. as the valve element starts to move, the sealing element deforms in the region of the sealing seat under the action of the hydraulic pressure in such a way that the sealing seat expands and moves, for part of the lift of the valve element, together with this valve element. Allowance has to be made for this behaviour of the sealing element when designing the valve arrangement. It is therefore necessary to provide a large enough lift to guarantee reliable opening of the valve arrangement despite the pressure-related deformation of the valve seat. The valve element however has to complete this lift also during initiation of a braking operation, thereby delaying the response of the brake system.

In order to prevent such pressure-induced deformations at the sealing element, it is further known from EP 0 607 370 B2 to provide an additional valve, which during a pressure build-up separates the pressure chamber from the valve arrangement and therefore prevents high hydraulic pressures at the valve arrangement. This solution is however considerably more costly to manufacture and more susceptible to faults when in operation.

DE 39 32 248 A1 and U.S. Pat. No. 2,136,835 each disclose a piston with valve arrangement, in which piston the valve element during a pressure build-up is pressed by an annular bead into the sealing element. These solutions are susceptible to wear owing to the high mechanical loads acting upon the sealing element.

BRIEF SUMMARY OF THE INVENTION

An object of the present invention is to provide a piston of the initially described type which, while being of a simple design and highly resistant to wear, allows a rapid pressure build-up in the pressure chamber.

This object is achieved according to the invention by a piston with a valve arrangement for a vehicle hydraulic brake system, wherein the piston comprises a piston channel penetrating the piston, a valve seat formed around an opening of the piston channel, and a valve element, which is displaceable relative to the piston and, for sealing the piston channel, is positionable in a fluid-tight manner against the valve seat, wherein the sealing seat takes the form of an annular projection on a sealing component, which comprises an elastic sealing element and a support element, which stabilizes the sealing element. To achieve the previously stated object, according to the invention it is further provided that the support element is designed in a region close to the sealing projection with a corresponding annular recess.

The purpose of the annular recess is to receive the material of the sealing element that is deformed under high pressure in the region of the sealing seat and hence to direct the deformation towards the support element. This is achieved in particular also in that the surface of the support element in the region of the annular recess effects a better stabilization of the material of the sealing element and keeps it dimensionally more stable than is the case with the previously described background art. A better reinforcement of the elastic material of the sealing element is achieved by the enlargement of the surface of the support element by means of the annular recess than is the case with the background art.

A further increase of the dimensional stability of the sealing element is achievable according to the invention in that the sealing element is connected adhesively to the support element. This further reduces the deformability of the sealing element and stabilizes the sealing element as a whole. The adhesive connection may be effected by glueing or by vulcanizing the sealing element onto the support element.

In a development of the invention, it is provided that the annular sealing projection, viewed in cross section, has a round contour with a shallow flank trailing in the direction of the pressure chamber. The round and continuous run of the cross-sectional contour of the sealing projection prevents pressure peaks from occurring at the sealing projection and leading to locally concentrated extreme mechanical stress. The shallow trailing flank, precisely in the region subject to high pressure, ensures a well-balanced pressure distribution over a relatively large area and therefore leads to a reduction of the deformation.

In order to distribute pressure- and deformation-induced mechanical loads as uniformly as possible in the material of the sealing element also by means of the configuration of the annular recess, in a development of the invention it is provided that the annular recess, viewed in cross section, has a round, preferably circular-segment-round, contour.

Alternatively, it may however be provided that the annular recess, viewed in cross section, has a polygonal, preferably trapezoidal, contour. In the latter case, the sides serve as mechanical resistance to a deformation or flowing of the elastic sealing element material.

It was explained above that by means of the shape of the annular recess the deformation- and flow behaviour of the material of the sealing element may be influenced. As a further measure for purposefully controlling the deformation of the sealing element under pressure load, in a development of the invention it is provided that the annular recess is disposed, in relation to the sealing projection, closer to the opening of the piston channel. In other words, this means that the sealing projection lies, in relation to the annular recess, closer to the pressure chamber. If there is a high pressure in the pressure chamber, then a relatively high pressure difference exists at the sealing element between pressure chamber and piston channel. This pressure difference leads to a deformation of the material of the valve element in the region of the sealing projection in the direction of the piston channel. By virtue of the offset arrangement of sealing projection and annular recess, the material of the sealing projection is pressed initially in radial direction into the annular recess, so that an undesirable lift-increasing deformation of the sealing element in axial direction—as is the case with the background art—may be prevented.

With regard to the valve arrangement, in a development of the invention it is provided that the valve element comprises a valve tappet, which is guided in a guide element, and a valve disc, which interacts with the sealing seat. It may further be provided that the guide element is disposed in a receiving channel provided in the sealing component and that the valve disc has a substantially flat surface, which interacts with the sealing seat. Thus, the valve element and the sealing component, while being highly functional, are of a simple design and inexpensive to manufacture. With regard to the detailed construction of the guide element, in a development of the invention it is provided that the guide element comprises a guide bush, which guides the valve tappet, wherein the guide bush is held, preferably centrally, in the sealing component by means of at least one retaining web and wherein a fluid channel is formed between the guide bush and the sealing component.

To guarantee reliable and rapid closing of the valve arrangement during a braking operation, according to the invention it may further be provided that the valve element is biased by biasing means into a sealing position, in which it lies in a fluid-tight manner against the valve seat. In the ready position of the piston the valve element is then displaced out of its sealing position, so that the valve arrangement opens. The valve element is held in this open position until the piston is moved for the pressure build-up in the pressure chamber. The biasing means then effect a transfer of the valve element to the sealing position, simultaneously reducing the risk of jamming or blocking.

According to the invention, the sealing element may be formed from a flexible plastics material, in particular from an elastomer, and the support element may be formed from a material that is harder than the flexible plastics material, in particular from a metal material.

The invention further relates to a master brake cylinder arrangement comprising a master cylinder, a piston of the previously described type guided displaceably in the master cylinder, stop means defining a predetermined normal position of the piston, and biasing means biasing the piston into the normal position, wherein the piston together with the master cylinder encloses a pressure chamber, wherein moreover in the normal position the valve element is lifted off the sealing seat and the pressure chamber is connected by the piston channel fluidically to the fluid reservoir and wherein, upon displacement of the piston from its normal position counter to the action of the biasing means, the valve element positions itself against the sealing seat and a brake pressure builds up in the pressure chamber.

Other advantages of this invention will become apparent to those skilled in the art from the following detailed description of the preferred embodiment, when read in light of the accompanying drawings.

BRIEF DESCRIPTION OF THE DRAWINGS

The invention is described below by way of example with reference to the accompanying drawings. The drawings show.

DETAILED DESCRIPTION OF THE INVENTION

Figure 1:
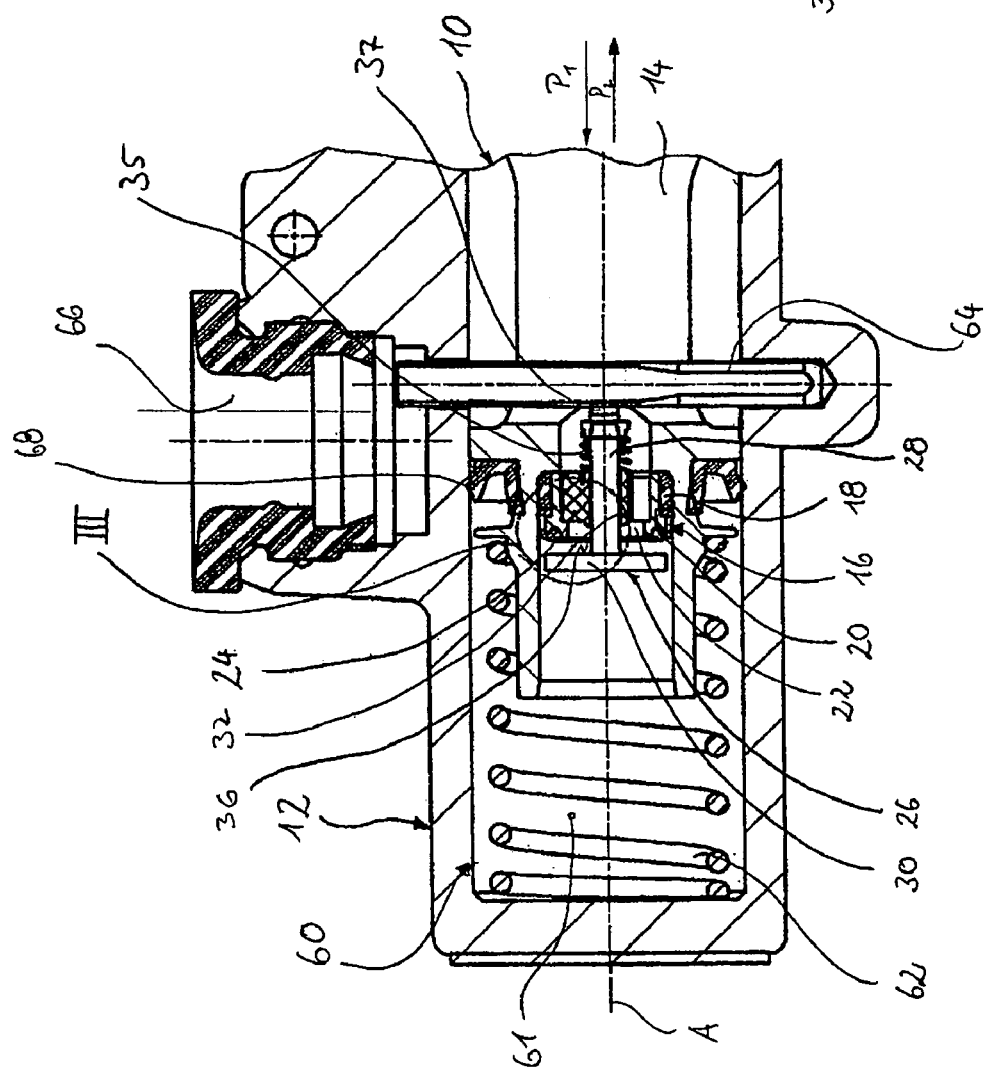
FIG. 1 an axis-containing partial section of a master cylinder arrangement according to the invention.

In FIG. 1, a piston according to the invention is illustrated in an axis-containing part-sectional view and generally denoted by 10. The piston 10 is guided movably in the direction of the axis A in a cylinder housing 12 of a master cylinder. The piston 10 is designed with a stepped piston channel 14, which penetrates the piston axially. A sealing component 16, comprising a sealing element 18 and a support element 20, is installed with press fit adhesion in the piston channel 14. The design of the sealing component 16 is additionally described in detail below.

Figure 2:
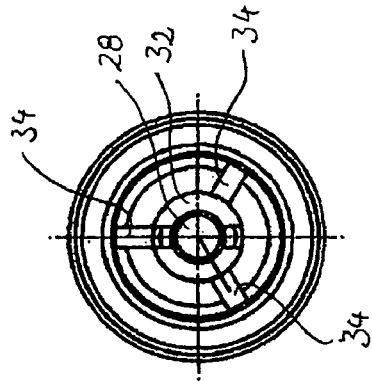
FIG. 2 a plan view of the piston from the left.

The sealing component 16 is designed likewise with a central stepped through-channel 22, in which a guide element 24 is received and press-fitted such as to be locked against displacement. In the guide element 24 a valve element 26 is guided in an axially displaceable manner. The valve element 26 comprises a valve tappet 28 and a valve disc 30. For guiding the valve element 26 in the guide element 24, the valve tappet 28 is accommodated with slight play in a corresponding guide bush 32 of the guide element 24 (see FIG. 2). The guide bush 32 is pressed into and held axially in the through-channel 22 of the sealing component 16 by means of retaining webs 34. By means of a restoring spring 35, which is disposed between the guide bush 32 and the free end of the valve tappet 28 that is provided with a lock washer 37, the valve element 26 is biased in such a way that the valve disc 30 is pressed with its underside 36 into abutment on a valve seat 38 on the end 40 facing the valve disc 30.

Figure 3:
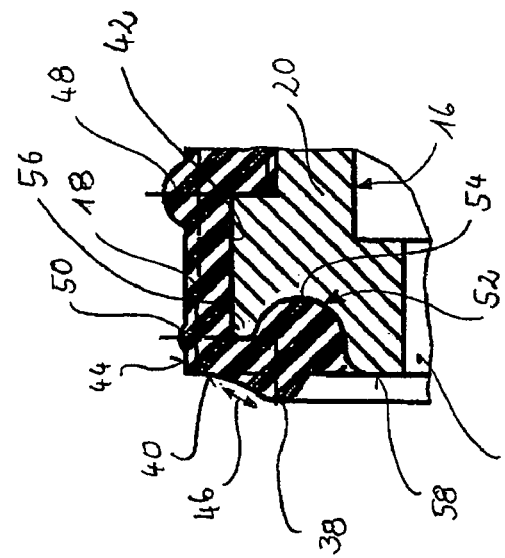
FIG. 3 an enlarged detail view of the valve element denoted by III in FIG. 1.

For a closer description of the sealing component 16, reference is made to FIG. 3, which is an enlarged view of the partial detail of FIG. 1 denoted by III. The sealing component 16 comprises the sealing element 18 and the support element 20. Both are connected adhesively to one another at their common contact surface 42, e.g. by vulcanizing the sealing element 18 onto the support element 20 or by glueing them to one another.

The sealing element 18 on its end face 40 has the valve seat 38 in the form of an annular sealing projection. Its contour—viewed in the axis-containing cross section—from the radially inner side facing the through-channel 22 extends substantially in the shape of a segment of a circle and then tapers off with a sloping flank in the region denoted by 46. The sealing element 18 on its outer peripheral surface 44 further comprises a plurality of bead-shaped sealing projections 48 running round in peripheral direction as well as a bead-shaped support projection 50 running round in peripheral direction and disposed close to the valve seat. The sealing projections 48 are used to enable the sealing component 16 to be pressed with a press fit and in a fluid-tight manner into the piston 10, as shown in FIG. 1. The support projection 50 additionally stabilizes the region of the end 40 of the sealing element 18 by being supported against the inner wall of the piston channel 14.

Figure 4:
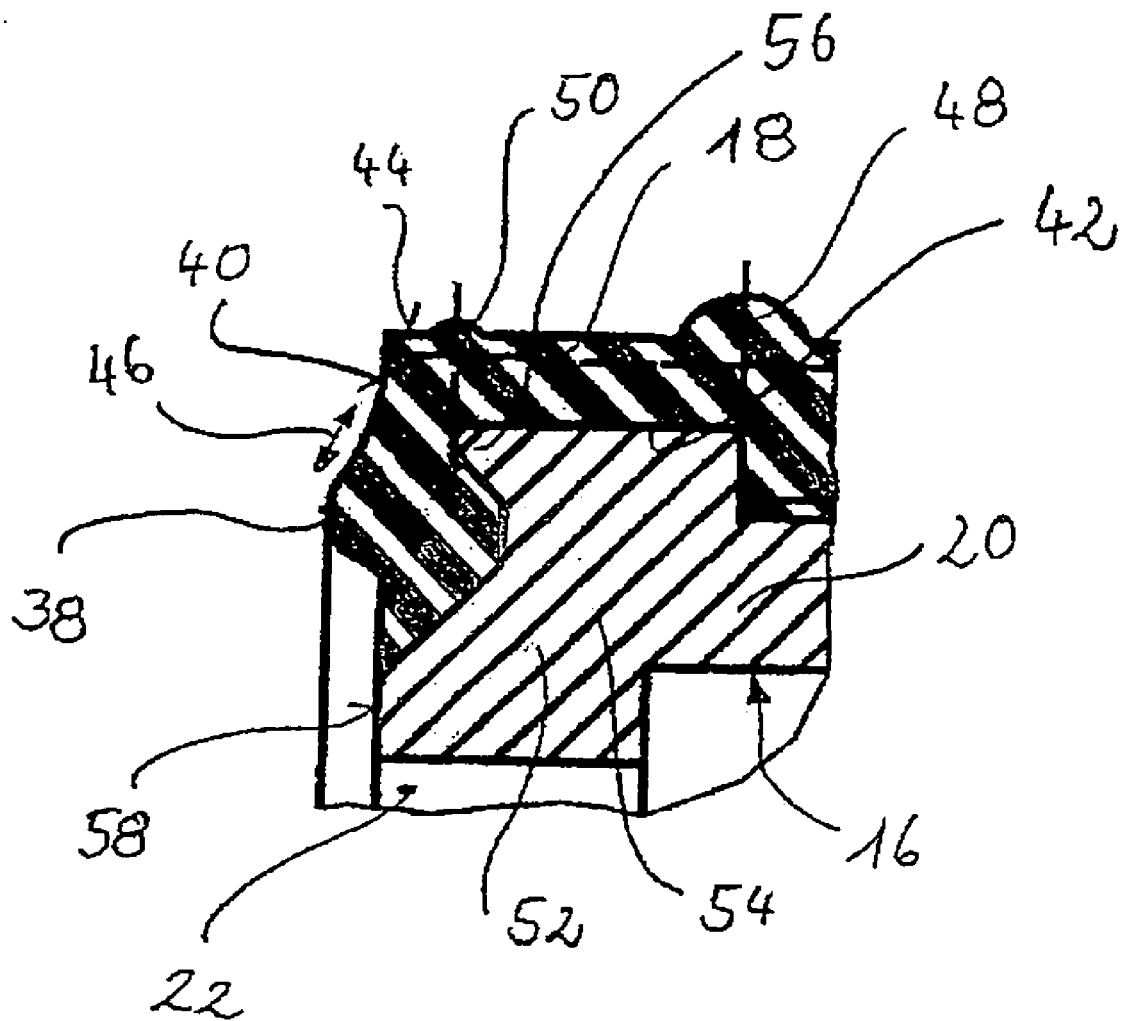
FIG. 4 an enlarged detail view of an alternate embodiment of the valve element.

The support element 20 in its end region 52 facing the end 40 has an annular recess 54 extending in peripheral direction around the axis. The annular recess 54—viewed in the axis-containing cross section—possesses, for the most part, a contour that is round like a segment of a circle with harmonically rounded-off transitions. Alternatively, as shown in FIG. 4. it may however be provided that the annular recess 54', viewed in cross section, has a polygonal, preferably trapezoidal, contour. In the latter case, the sides serve as mechanical resistance to a deformation or flowing of the elastic sealing element material. The annular recess 54 is filled up with elastic material of the sealing element 18. In its radially outer region, the support element 20 has a circumferential stabilizing edge 56, which stabilizes the radially outer region of the sealing element 18. In the radially inner region of the sealing component 16, an end face portion 58 of the support element 20 is not covered by the material of the sealing element 18.

Returning to FIG. 1, it may be seen that the piston 10 is accommodated in a cylindrical cavity 60 of the cylinder housing 12, which is closed at one end, and together with the cylinder housing 12 encloses a pressure chamber 61 filled with hydraulic fluid. The piston 10 is biased by a spring 62 in FIG. 1 to the right into its ready position shown in FIG. 1 and is therefore applied under bias against a stop bolt 64, which extends transversely through the cylinder housing 12 and is fixed therein. In the cylinder housing 12 a connection port 66 is provided, by which the cavity 60 communicates with a non-illustrated fluid reservoir. The cylinder housing 12 further comprises a non-illustrated further connection port, by which the pressure chamber 61 is connected to the brake circuit of a motor vehicle.

At the outer periphery of the piston 10 a fluid seal 68 is provided, which prevents a flow of fluid along the outer periphery of the piston 10 upon axial movement of the piston 10 in the cylinder housing 12 and hence allows fluid-tight guidance of the piston in the cylinder.

The arrangement according to FIG. 1 operates as follows. Prior to initiation of a braking operation by the driver, the piston 10 is situated in its ready position shown in FIG. 1. In this ready position, the piston 10 is pressed by the spring 62 against the stop bolt 64. In said case, the valve tappet 28 presses with its free end against the stop bolt 64. The spring force of the spring 62 exceeds the spring force of the restoring spring 35, so that the valve element 26 occupies its open position shown in FIG. 1, in which the valve disc 30 is lifted off the valve seat 38. The pressure chamber 61 is therefore fluidically connected to the end of the piston channel 14 remote from the pressure chamber.

Upon an actuation of the brake, the piston 10 is displaced in FIG. 1 according to arrow $P_1$ to the left. In said case, the valve disc 30 moves closer and closer to the valve seat 38 until finally they both come into contact. From then on, upon further piston movement in the direction of arrow $P_1$, an above-atmospheric pressure builds up in the pressure chamber 61 and is transmitted to the brake circuit. On completion of the braking operation, the piston 10 moves according to arrow $P_2$ back into its normal position shown in FIG. 1. In said case, the valve element 26 again occupies its open position shown in FIG. 1.

Under the growing hydraulic pressure the valve element 26, or more precisely its valve disc 30, is pressed with increasing strength onto the valve seat 38, with the result that the valve seat 38 deforms under this pressure. The hydraulic fluid under the above-atmospheric pressure moreover acts upon the flank region 46, which is in contact with this hydraulic fluid and therefore likewise deforms. Given very high hydraulic pressures, a flowing of the material of the sealing element 18 may even occur in this region.

Because of the shape of the flank region 46 and the end region 52 of the support element 20, the previously mentioned deformation does not however lead to the effect whereby upon lifting of the valve disc 30 off the sealing seat 38 under high pressure in the pressure chamber 61 the sealing seat 38 deforms in axial direction according to arrow $P_1$ and because of this axially directed deformation prevents a rapid disengagement of valve disc underside 36 and sealing seat 38 for the purpose of a rapid pressure reduction in the pressure chamber 61. Instead of this, the material of the sealing element 18 deforms under the pressure of the hydraulic pressure in the pressure chamber 61 in such a way that it penetrates into the annular recess 54 and is displaced by it further in a radially inward direction. The shallow course of the flank 46 moreover brings about a rapid disengagement of valve disc underside 36 and valve seat 38. Thus, even given high hydraulic pressures in the pressure chamber 61, the invention guarantees a rapid lifting of the valve disc 30 off the valve seat 38 also with a small lift of the valve element 26. In this way, the response characteristic of the brake system may be improved.

The invention discloses a simple yet effective way of designing the piston plus central valve for a vehicle brake system that, even given high hydraulic pressures in the pressure chamber—optionally caused by an automatic system such as e.g. a traction control system or a stability program, guarantees a rapid pressure reduction on completion of the braking operation. This is achieved in particular by measures relating to the shape of the valve seat, so that an unwanted hydraulic-pressure-related deformation of the valve seat may be extensively suppressed.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Piston having a valve arrangement for a vehicle hydraulic brake system, comprising:
    a piston channel penetrating the piston,
    a valve seat formed around an opening of the piston channel and
    a valve element, which is displaceable relative to the piston and which for sealing the piston channel is positionable in a fluid-tight manner against the valve seat,
    wherein the valve seat takes the form of an annular projection on a sealing component, which comprises an elastic sealing element and a support element, which stabilizes the sealing element, and wherein the support element is designed in a region close to the sealing projection with a corresponding annular recess.

2. Piston according to claim 1, wherein the sealing element is connected adhesively to the support element.

3. Piston according to claim 1, wherein the annular sealing projection, viewed in cross section, has a round contour with a shallow flank running out in the direction of a pressure chamber.

4. Piston according to claim 3, characterized in that the annular recess, viewed in cross section, has a round, preferably circular-segment-round, contour.

5. Piston according to claim 3, wherein the annular recess, viewed in cross section, has a polygonal, preferably trapezoidal, contour.

6. Piston according to claim 1, wherein the annular recess is disposed, in relation to the sealing projection, closer to the opening of the piston channel.

7. Piston according to claim 1, wherein the valve element comprises a valve tappet, which is guided in a guide element, and a valve disc, which interacts with the sealing seat.

8. Piston according to claim 7, wherein the guide element is disposed in a receiving channel provided in the sealing component and that the valve disc has a substantially flat surface, which interacts with the sealing seat.

9. Piston according to claim 7, wherein the guide element comprises a guide bush, which guides the valve tappet, wherein the guide bush is held, preferably centrally, in the sealing component by means of at least one retaining web and wherein a fluid channel is formed between the guide bush and the sealing component.

10. Piston according to claim 1, wherein the valve element is biased by biasing means into a sealing position, in which it lies in a fluid-tight manner against the valve seat.

11. Piston according to claim 1, wherein the sealing element is formed from a flexible plastics material, in particular from an elastomer, and that the support element is formed from a material that is harder than the flexible plastics material.

12. Piston according to claim 11, wherein the support member is formed from metal.

13. Master cylinder arrangement for a vehicle hydraulic brake system comprising:
    a master cylinder,
    a piston guided in the master cylinder, wherein the piston includes:
        a piston channel penetrating the piston;
        a valve seat formed around an opening of the piston channel; and
        a valve element, which is displaceable relative to the piston and which for sealing the piston channel is positionable in a fluid-tight manner against the valve seat;
        wherein the valve seat takes the form of an annular projection on a sealing component, which comprises an elastic sealing element and a support element, which stabilizes the sealing element, and wherein the support element is designed in a region close to the sealing projection with a corresponding annular recess;
    stop means, which define a predetermined normal position of the piston, and
    biasing means, which bias the piston into the normal position, wherein the piston together with the master cylinder encloses a pressure chamber,
    wherein moreover in the normal position the valve element is lifted off the valve seat and the pressure chamber is fluidically connected by the piston channel to a fluid reservoir,
    and wherein, upon a displacement of the piston out of its normal position counter to the action of the biasing means, the valve element positions itself against the sealing seat and a brake pressure builds up in the pressure chamber.

* * * * *